No. 627,094. Patented June 20, 1899.
J. W. BONTA.
APPARATUS FOR MAKING GLASS PIPE.
(Application filed Nov. 11, 1897.)
(No Model.) 2 Sheets—Sheet 1.

No. 627,094. Patented June 20, 1899.
J. W. BONTA.
APPARATUS FOR MAKING GLASS PIPE.
(Application filed Nov. 11, 1897.)
(No Model.) 2 Sheets—Sheet 2.
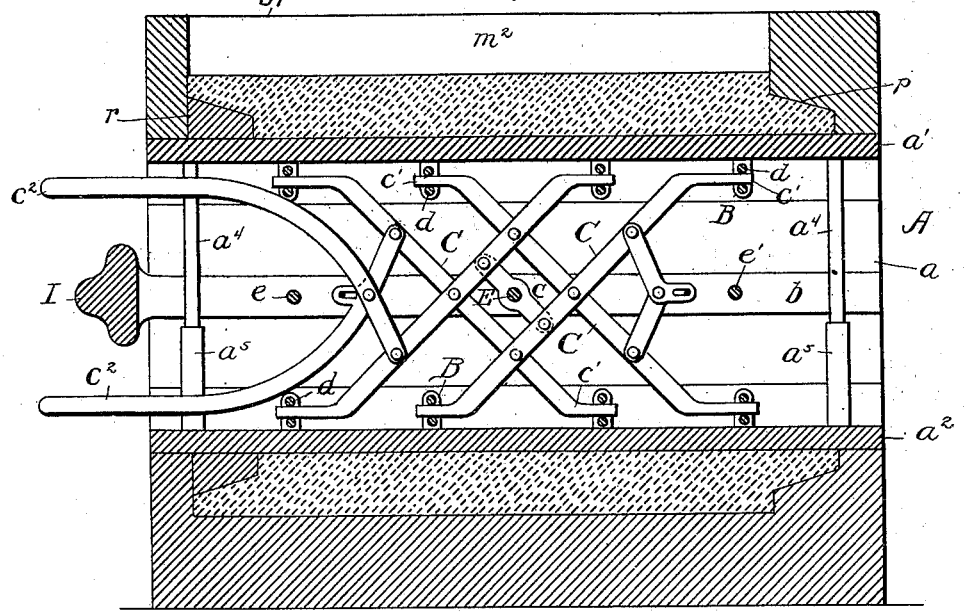
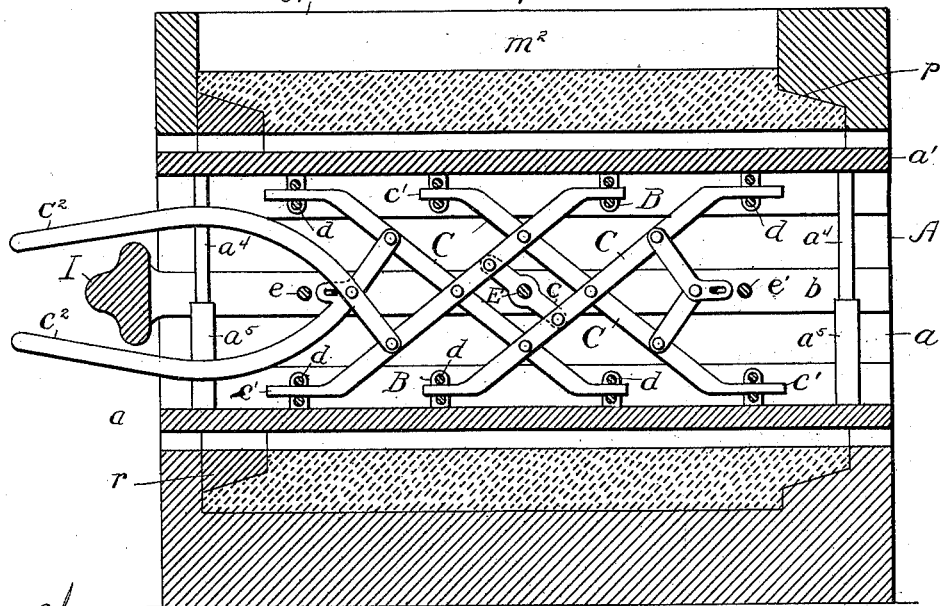
THE NORRIS PETERS CO., PHOTO-LITHO., WASHINGTON, D. C.

UNITED STATES PATENT OFFICE.

JAMES W. BONTA, OF WAYNE, PENNSYLVANIA, ASSIGNOR TO THE BONTA GLASS PIPE AND CONDUIT COMPANY, OF SCRANTON, PENNSYLVANIA.

APPARATUS FOR MAKING GLASS PIPE.

SPECIFICATION forming part of Letters Patent No. 627,094, dated June 20, 1899.

Application filed November 11, 1897. Serial No. 658,139. (No model.)

*To all whom it may concern:*

Be it known that I, JAMES W. BONTA, a citizen of the United States, and a resident of Wayne, Delaware county, State of Pennsylvania, have invented certain new and useful Improvements in Apparatus for Manufacturing Glass Pipe, of which the following is a full, clear, and exact description, reference being had to the accompanying drawings, forming part of this specification.

My invention relates to certain improvements in apparatus for the manufacture of pipe, and relates more particularly to a form of contractile core to be employed in the production of curved joints or elbows of glass or other material.

Figure 1:
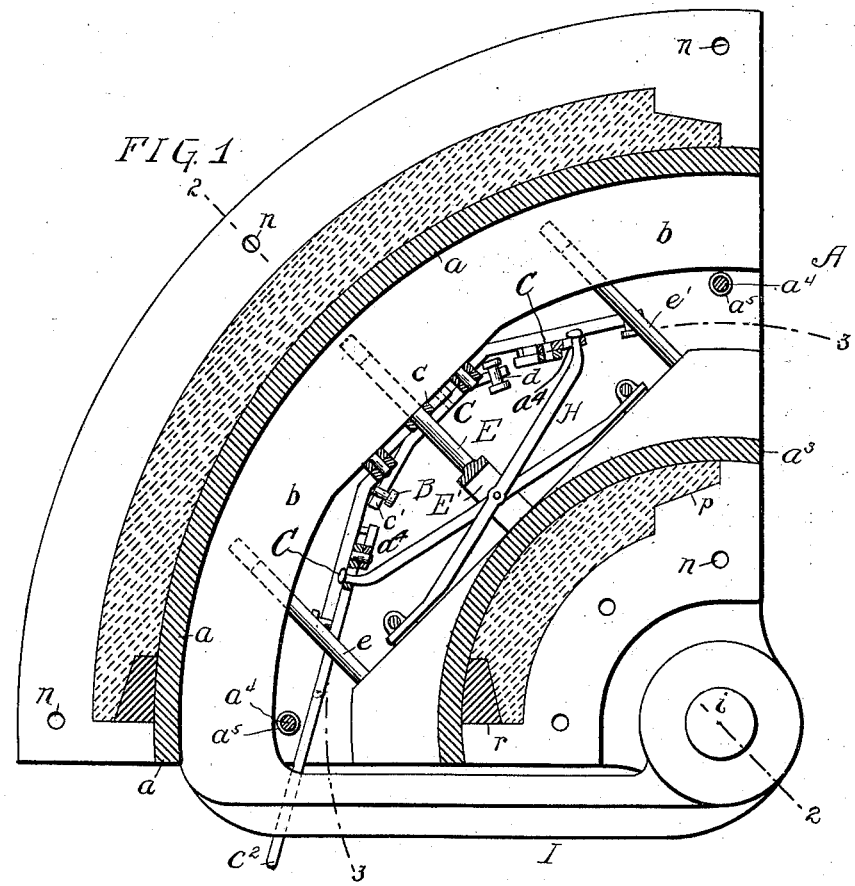
Figure 2:
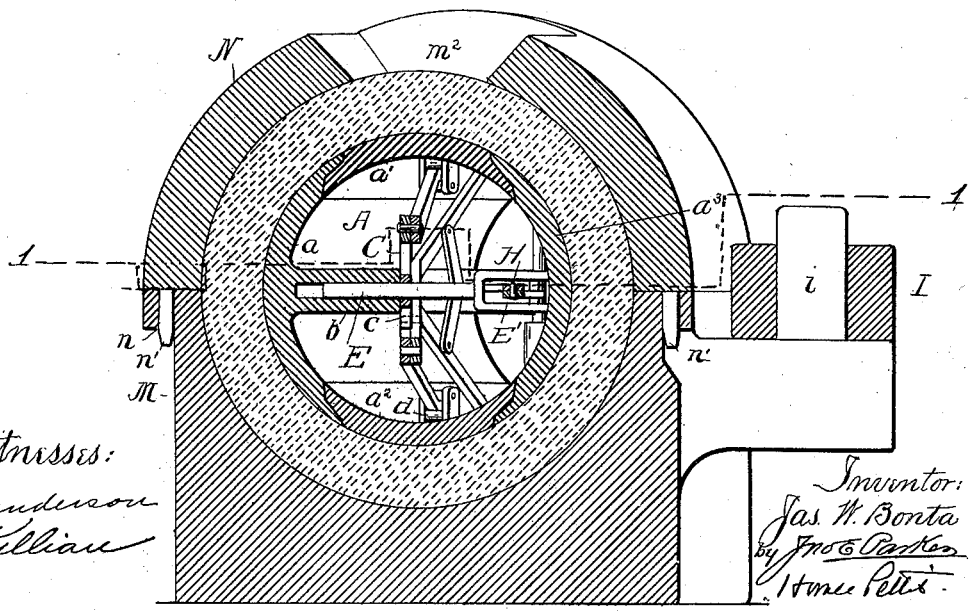

In the accompanying drawings, Figure 1 is a sectional plan view on the line 1 1, Fig. 2, of a contractile core constructed in accordance with my invention. Fig. 2 is a transverse sectional elevation of the same on the line 2 2, Fig. 1. Fig. 3 is a sectional elevation on the line 3 3, Fig. 1; and Fig. 4 is a view similar to Fig. 3, illustrating the parts in different positions.

Referring to the drawings, A represents a contractile core, comprising a base $a$ and radially-movable sections $a'$, $a^2$, and $a^3$. The base-section $a$, which forms the outer curved surface of the elbow, is stationary and is provided with an inwardly-projecting segmental bar $b$, to the central portion of which is pivoted the base-lever $c$ of a system of lazy-tongs C, the outer ends of which are connected to the upper and lower sections $a'$ $a^2$ in such manner that on the operation of the lazy-tongs these sections will be moved toward or from the center of the core. The two sections $a'$ $a^2$ are guided in their movements toward and from each other by rods $a^4$ on one section fitting telescopically into tubes $a^5$ on the opposite section.

To make the various connections between the ends of the levers and the movable sections on a curved line representing the center of such sections, the ends of each lever are bent toward the smaller circumference of the core in the manner illustrated in Fig. 1, and to provide for the free operation of the levers the extreme end of each lever is narrowed down, as at $c'$, and passes between pins or rollers $d$ on blocks B, which are secured to or formed integral with said upper and lower sections, thus permitting a free longitudinal movement of the ends of the levers with respect to the movable sections.

The end levers at one or at both ends of the system of lazy-tongs are extended out beyond the end of the core and are provided with handles $c^2$, which may be conveniently grasped by the operator in contracting and expanding the core.

The smaller circumference of the elbow formed by the movable section $a^3$ is provided with guiding-posts E, $e$, and $e'$, the rear ends of which pass through guiding-openings formed in the segmental bar $b$ and provided for the support of such section when the core is contracted.

Pivoted to the end levers of the lazy-tongs C are lazy-tong levers H, which extend through an opening E' in the guide-post E and at their opposite ends are connected to the section $a^3$ by the ends of the levers engaging slots $a^4$ in the levers C.

The central bar $b$ extends out for some distance beyond the end of the core and is rigidly secured to an arm I, pivoted at one end on a stud $i$ on the section M of the mold, the center of which forms also the center of the inner and outer circumference of the elbow, and when it is necessary to withdraw the core from the interior of a manufactured pipe the core moves with the stud $i$ as its center and swings gradually out from the pipe without danger of injurious contact therewith.

The mold comprises a base-section M, provided with sockets $n$, and a removable top section N, having pins $n'$, adapted to enter said sockets $n$ and hold the two sections in proper relative position. At one end of the mold-section is a circular flange which acts to form at one end of the elbow an annular flange $p$, forming a spigot on the end of the elbow to enter a recess or socket in the end of an adjacent length of pipe. The recess or socket at the opposite end of the elbow is formed by placing on the core an annulus $r$ of suitable shape and size to form the required recess or socket.

In the top of the section N of the mold is a segmental opening $m^2$, through which the glass is poured after the assemblement of the expanded core and the mold-sections, and after the mold has been filled with molten glass the excess of glass is removed from the space between the top sections, the outside of the pipe shaped to curved form by a suitable implement, such as a slick used by glass-molders, and the elbow thus formed having been allowed to remain until its temperature is slightly reduced the lazy-tongs C are contracted, causing first a movement of the sections $a'\, a^2$ toward each other, and then, through the lazy-tongs H, the section $a^3$ is moved inwardly until the core is fully contracted, after which it may be swung with the stud $i$ as a center and entirely removed from the interior of the pipe. The manufactured pipe is then removed from the mold and placed in an annealing-oven to be annealed.

Having thus described my invention, what I claim, and desire to secure by Letters Patent, is—

1. A collapsible core formed of a stationary main, and a plurality of secondary movable sections, lazy-tongs supported by the main section and connected to the secondary sections.

2. In a curved core the combination of a main section on the outer circumference of the curve, an inwardly-extending rib on said section, a main series of lazy-tongs pivoted on said rib, movable upper and lower auxiliary sections, said main series of lazy-tongs being connected to said upper and lower sections, an inner auxiliary section forming the inner circumference, an auxiliary set of lazy-tongs connected to the main series of lazy-tongs and to the inner auxiliary sections 3. In combination, a core comprising sections, $a$, $a'$, $a^2$, $a^3$, a central rib, $b$, formed on the section, $a$, lazy-tongs, C, centrally pivoted on the rib, $b$, and having their opposite ends connected to the sections, $a'$, $a^2$, an auxiliary set of lazy-tongs, H extending between the lazy-tongs, C, and the smaller section, $a^3$, substantially as specified.

4. In an apparatus for the manufacture of curved pipe a collapsible core-body having curved sides and arranged to form an elbow, a mold within which said core is placed, a pivot-stud arranged at the center of the inner and outer circumference of the core and a core-carrying bar pivoted to said stud, substantially as specified.

5. In an apparatus for the manufacture of curved glass pipe a collapsible core formed of a series of curved sections, a sectional mold having an open top for the introduction of the molten glass, a pivot-stud having its center concentric with the inner and outer curved lines of the core and a core-carrying bar extending from said stud to said core, substantially as specified.

In witness whereof I have hereunto set my hand this 4th day of November, A. D. 1897.

JAMES W. BONTA.

Witnesses:
JNO. E. PARKER,
EDMUND S. MILLS.